United States Patent [19]

Hiroshima

[11] Patent Number: 5,151,801
[45] Date of Patent: Sep. 29, 1992

[54] LIQUID CRYSTAL DISPLAY APPARATUS PROVIDING IMPROVED ILLUMINATION VIA TRUCATED PRISMS

[75] Inventor: Yasunori Hiroshima, Tokyo, Japan

[73] Assignee: Pioneer Electronic Corporation, Tokyo, Japan

[21] Appl. No.: 619,641

[22] Filed: Nov. 29, 1990

[30] Foreign Application Priority Data

Nov. 30, 1989 [JP] Japan .................. 1-308881

[51] Int. Cl.⁵ .................................... G02F 1/1335
[52] U.S. Cl. ................................ 359/40; 359/41
[58] Field of Search ............. 350/331 R, 334; 359/40, 359/41

[56] References Cited

U.S. PATENT DOCUMENTS

| | | | |
|---|---|---|---|
| 4,126,382 | 11/1978 | Barzilai et al. | 359/55 |
| 4,790,632 | 12/1988 | Miyakawa et al. | 350/347 V |
| 4,836,652 | 6/1989 | Oishi et al. | 350/334 |
| 4,945,348 | 7/1990 | Ibamoto et al. | 350/330 X |

FOREIGN PATENT DOCUMENTS

| | | |
|---|---|---|
| 60-201326 | 10/1985 | Japan . |
| 60-241024 | 11/1985 | Japan . |
| 62-94826 | 5/1987 | Japan . |
| 1-35416 | 2/1989 | Japan . |
| 1-189685 | 7/1989 | Japan . |
| 1-222221 | 9/1989 | Japan . |

OTHER PUBLICATIONS

M. Brandon, "Display Device", IBM Technical Disclosure Bulletin, vol. 19, No. 2, Jul. 1976, p. 691.

Primary Examiner—Stanley D. Miller
Assistant Examiner—Ron Trice
Attorney, Agent, or Firm—Sughrue, Mion, Zinn Macpeak & Seas

[57] ABSTRACT

Illuminating light from a light source is reflected by a reflector and collimated by a condenser lens and then applied onto the back of a liquid crystal cell. The liquid crystall cell has attached on its light source side an optical sheet which consists of a large number of optical elements such as convex or concave lenses aligned with picture elements or pixels of the liquid crystal cell. The optical elements each converge the rays of light from the light source onto each of the pixels, so that the rays that would otherwise strike a matrix circuit section and a black matrix layer will be focused on and passed through the pixels. This enhances the brightness of an image formed on the front of the liquid crystal cell and also prevents temperature rise in the liquid crystal cell because the black matrix layer and the matrix circuit section, components of the liquid crystal cell, are not struck and heated by the incoming light rays.

3 Claims, 4 Drawing Sheets

F I G. 13
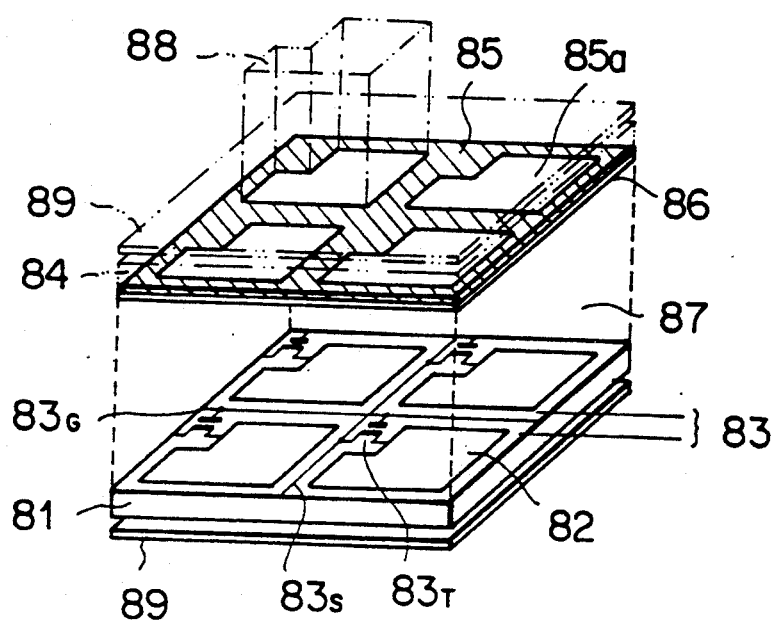

LIQUID CRYSTAL DISPLAY APPARATUS PROVIDING IMPROVED ILLUMINATION VIA TRUCATED PRISMS

BACKGROUND OF THE INVENTION

The present invention relates to a liquid crystal display apparatus in which illuminating light is radiated from the back of an active matrix type liquid crystal cell and more particularly to a liquid crystal display apparatus suited for application on a liquid crystal projector.

PRIOR ART

A conventional liquid crystal display apparatus of this kind has a construction as shown in FIG. 12. In the figure, light from a light source 5 is reflected by a reflector 6 and collimated by a condenser lens 7. The parallel rays of light are then radiated onto the back of an active matrix type liquid crystal cell 8. The light that passes through the liquid crystal cell 8 forms an image.

FIG. 13 shows the construction of the active matrix type liquid crystal cell 8.

On a glass substrate 81 are formed transparent picture cell electrodes 82 or pixel electrodes such as ITO and a matrix circuit section 83 to apply voltage to these pixel electrodes 82. Thin-film transistors $83_T$ in the matrix circuit section 83 are each connected to the pixel electrodes 82 and also connected with a gate line $83_G$ and a source line $83_S$. On a glass substrate 84 is formed a black matrix layer 85, which covers the matrix circuit section 83 and has openings 85a at portions facing the pixel electrodes 82. The glass substrate 84 also has a common electrode 86 formed thereon, such as transparent ITO, which opposes the pixel electrodes 86. A liquid crystal layer 87 is interposed between the pixel electrodes 82 and the common electrode 86. A pixel or picture element 88 is formed by the opening 85a of the black matrix layer 85 and the pixel electrode 82. Polarizing plates 89 are attached on the outer sides of the glass substrates 81, 84.

According to image signals applied to the gate line $83_G$ and the source line $83_S$, pixel information is written into a capacitance between the pixel electrode 82 and the common electrode 86.

In the active matrix type liquid crystal cell 8, the area of the pixel 88 is equivalent to that of the opening 85a in the black matrix layer 85, so that the brightness of the image on the conventional display apparatus is determined by the opening factor of the opening 85a. Thus, when the number of pixels is increased, the area occupied by the matrix circuit section 83 also increases, which in turn reduces the opening factor of the pixels 88 and therefore the brightness of the image.

As one of the apparatuses employing the above-mentioned crystal cells, a liquid crystal projector has been developed which projects an enlarged image from the liquid crystal cell onto a screen. In such a projector the liquid crystal cell is required to form an image with high luminance enough to produce an enlarged projected image. The liquid crystal projector, in particular, uses a high-output metal halide lamp as a light source, so that the liquid crystal cell is easily heated by the high-energy light radiated against the matrix circuit section and the black matrix layer. The resulting temperature rise in the liquid crystal cell may degrade its performance.

SUMMARY OF THE INVENTION

The present invention has been accomplished with a view to overcoming the above drawback, and its objective is to provide a liquid crystal display apparatus using an active matrix type liquid crystal cell, which makes effective use of illuminating light to suppress a temperature rise in the liquid crystal cells and also increase the brightness of an image.

To achieve the above objective, in the liquid crystal display apparatus of this invention that uses an active matrix type liquid crystal cell and a light source to throw light upon the back of the liquid crystal cell, optical elements are arranged on the light source side of the liquid crystal cell and aligned with pixels to converge light from the light source onto the pixels, thus making effective use of illuminating light in suppressing temperature rise in the liquid crystal cell and increasing the brightness of an image.

BRIEF DESCRIPTION OF THE DRAWINGS

FIG. 13 is a schematic diagram showing the structure of an active matrix type liquid cell.

PREFERRED EMBODIMENT OF THE INVENTION

Figure 1:
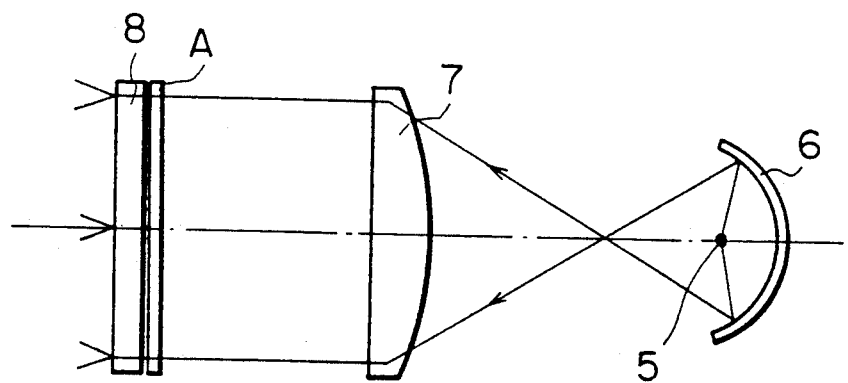
FIG. 1 is a schematic diagram showing a liquid crystal display apparatus as one embodiment of this invention.
Figure 12:
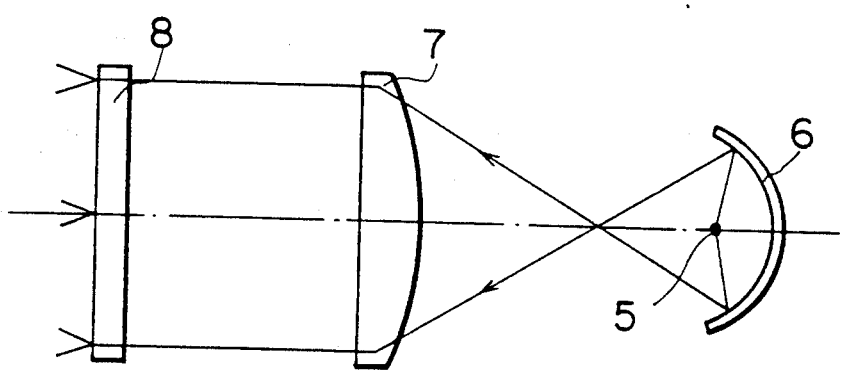
FIG. 12 shows one example of a conventional liquid crystal apparatus.

FIG. 1 shows a liquid crystal display apparatus as one embodiment of this invention. The components that are identical with those in FIG. 12 are given like reference numerals.

In the figure, reference symbol A denotes an optical sheet attached on the back (the light source side) of a liquid crystal cell 8 and represents all the optical sheets 1 to 4 described in each of the succeeding embodiments.

Illuminating light from a light source 5 is reflected by a reflector 6 in the form of a rotating elliptic surface and collimated by a condenser lens 7 before being radiated on the optical sheet A.

The optical sheet A, as described later, is formed of a large number of optical elements, such as convex lenses or prisms, aligned in position with each of picture elements or pixels of the liquid crystal cell 8. Each of the optical elements collects incoming illuminating light onto each corresponding pixel so that the major portion of the light coming from the condenser lens 7 is radiated against the pixels of the liquid crystal cell 8. The light that has passed through the pixels onto the front side of the liquid crystal cell 8 forms an image on it.

Figure 2:
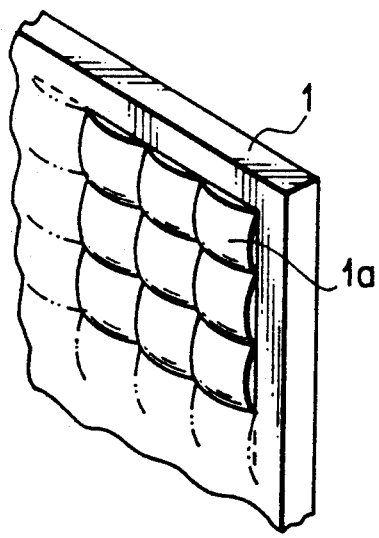
FIG. 2 is a perspective view of a first embodiment of an optical sheet.
Figure 3:
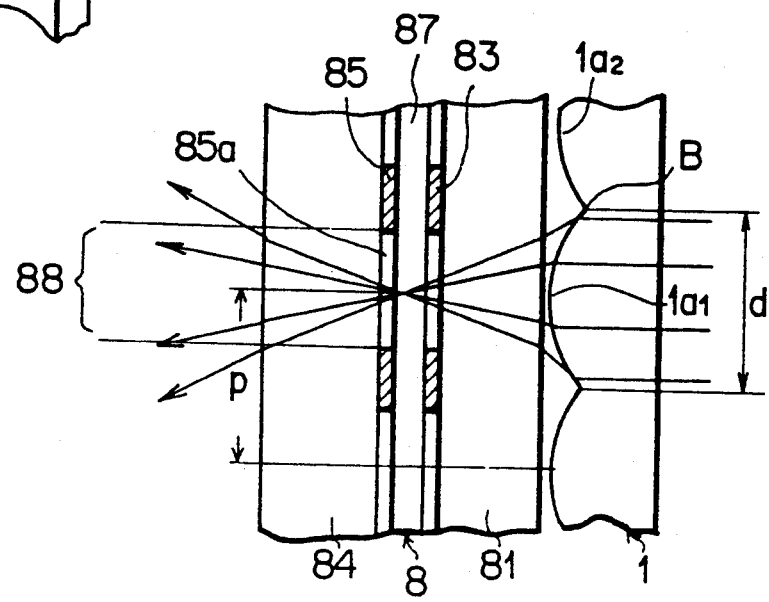
FIG. 3 is a schematic diagram showing the arrangement and action of the first embodiment of the optical sheet.

FIG. 2 shows a first embodiment of the optical sheet A and FIG. 3 the arrangement and action of the optical sheet. The optical sheet 1 is formed of a transparent acrylic material and has on its surface a large number of convex lenses 1a arranged at the same pitches as the pixels of the liquid crystal cell 8. In FIG. 2, only a part of the optical sheet is shown for simplicity.

As shown in FIG. 3, the optical sheet 1 has convex lenses 1a on the side of the liquid crystal cell 8, with the diameter d of each convex lens 1a set equal to a pitch p. A boundary portion B between the adjacent convex lenses $1a_1$ and $1a_2$ is set at a position corresponding to the matrix circuit portion 83 of the liquid crystal cell 8. The illuminating light entering each convex lens 1a, which includes rays of light that would otherwise be radiated against the matrix circuit section 83, is focused on the corresponding pixel 88. The light then passes through a liquid crystal layer 87 and goes out from an opening 85a.

Hence, the illuminating light that would have been radiated against the black matrix layer 85 if the optical sheet 1 was not provided is collected by the convex lens 1a into the pixel. This makes effective use of the illuminating light, forming a bright image. Another advantage is that since light is not radiated against the matrix circuit section 83 nor the black matrix layer 85, the liquid crystal cell 8 can be prevented from being heated.

Figure 4:
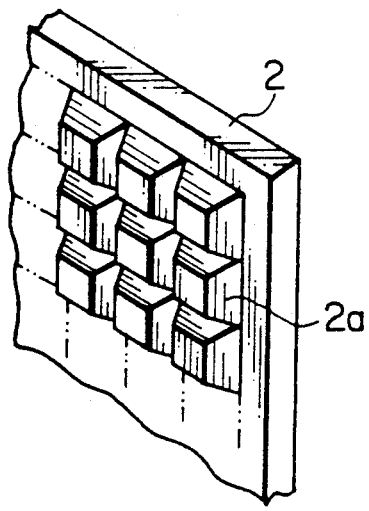
FIG. 4 is a perspective view of a second embodiment of the optical sheet.
Figure 5:
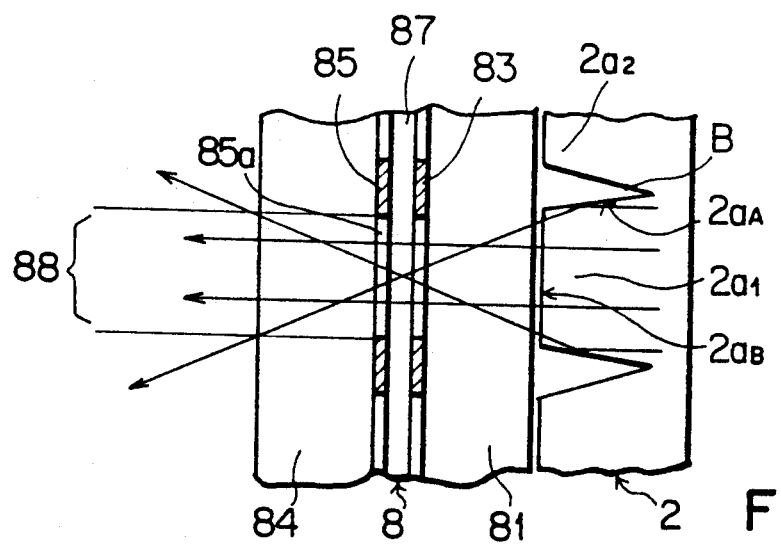
FIG. 5 is a schematic diagram showing the arrangement and action of the second embodiment of the optical sheet.

FIG. 4 shows a second embodiment of the optical sheet A, and FIG. 5 its arrangement and action. The optical sheet 2 of this embodiment is formed of the same transparent acrylic material as in the first embodiment. On the surface of the optical sheet 2 are formed a large number of truncated pyramidal prisms 2a arranged at the same pitches as the pixels of the liquid crystal cell 8. It is noted that the term truncated prism as used herein refers to a prism having opposite planar top and bottom surfaces and side walls by means of which the rays of light from the light source are focused on the corresponding pixel.

As shown in FIG. 5, the prisms 2a are directed toward the liquid crystal cell 8 and the boundary portion B between the adjacent prisms $2a_1$ and $2a_2$ is set at a position corresponding to the matrix circuit section 83. Of the light rays incident upon each prism 2a, those rays that would hit the matrix circuit section 83 if optical elements were not provided are reflected by a side surface $2a_A$ of the prism 2a and gathered from an upper surface $2a_B$ into the pixel 88. That is, the illuminating light including the light that corresponds to the matrix circuit section 83 is focused on the pixel 88 by the corresponding prism 2a. And the light that has passed through the liquid crystal layer 87 is thrown out from the openings 85a. Therefore, as with the first embodiment, the illuminating light is effectively utilized to provide a bright image. At the same time, the temperature rise in the liquid crystal cell 8 can be prevented.

Figure 6:
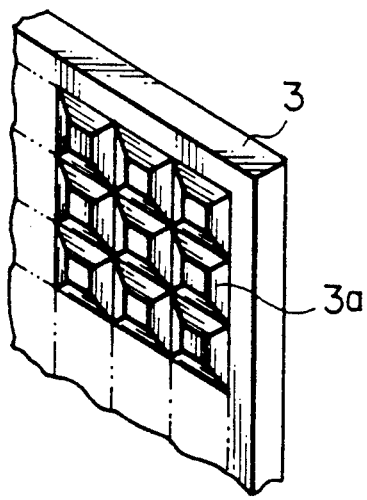
FIG. 6 is a perspective view of a third embodiment of the optical sheet.
Figure 7:
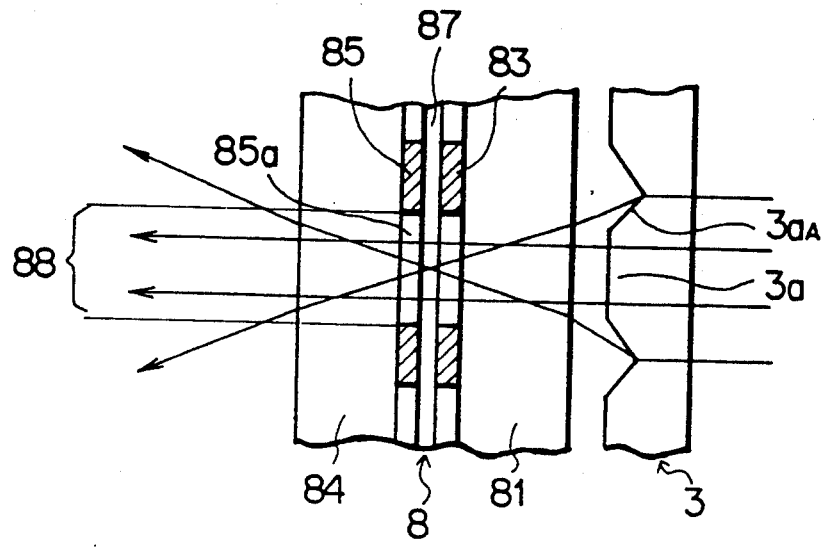
FIG. 7 is a schematic diagram showing the arrangement and action of the third embodiment of the optical sheet.

FIG. 6 shows a third embodiment of the optical sheet A, and FIG. 7 its arrangement and action. The optical sheet 3 of this embodiment is formed of a large number of truncated pyramidal prisms 3a arranged at the same pitches as the pixels, as with the second embodiment.

The prism 3a is lower in height than the prism 2a of the second embodiment. The light entering that part of the prism which corresponds to the matrix circuit section 83 is refracted by a side surface $3a_A$ of the prism 3a to be led into the pixel 88, forming a bright image and preventing a temperature rise of the liquid crystal cell 8.

The optical sheets 1 to 3 of the above embodiments with a number of convex or concave elements formed on their surface may easily be formed by injection molding or hot pressing of acrylic resin or by performing an ultraviolet ray processing on a photo-form glass.

Figure 8:
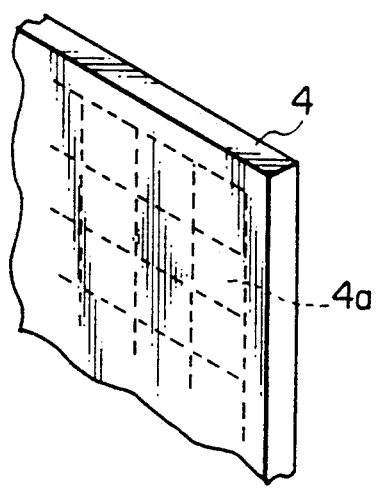
FIG. 8 is a perspective view of a fourth embodiment of the optical sheet.
Figure 9:
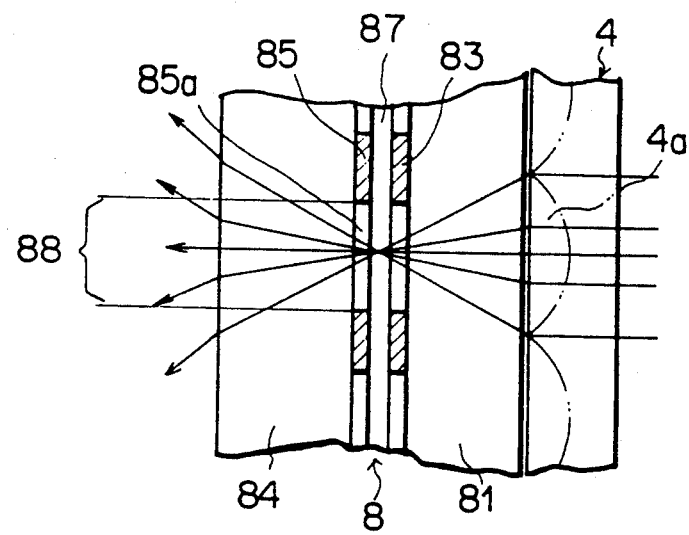
FIG. 9 is a schematic diagram showing the arrangement and action of the fourth embodiment of the optical sheet.

FIG. 8 shows a fourth embodiment of the optical sheet A and FIG. 9 its arrangement and action. The optical sheet 4 of this embodiment consists of refraction factor distributing type lenses 4a arranged at the same pitches as the pixels of the liquid crystal cell 8 and formed in a glass plate. The refraction factor distributing type lens 4a may be formed by an ion exchange technology and a photolithography technology.

Like the foregoing embodiments, the optical sheet 4 of this embodiment focuses the light entering that portion of each lens which corresponds to the matrix circuit section 83 on the corresponding pixels 88 by the refraction factor distributing type lens 4a. In this way, the effect similar to that obtained in the preceding embodiments can be produced.

Figure 10:
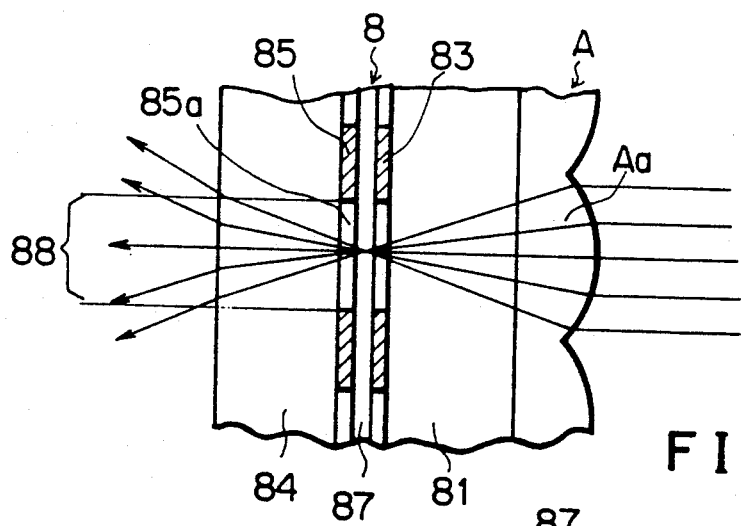
FIGS. 10 and 11 are schematic diagrams showing the arrangements of other optical sheets.
Figure 11:
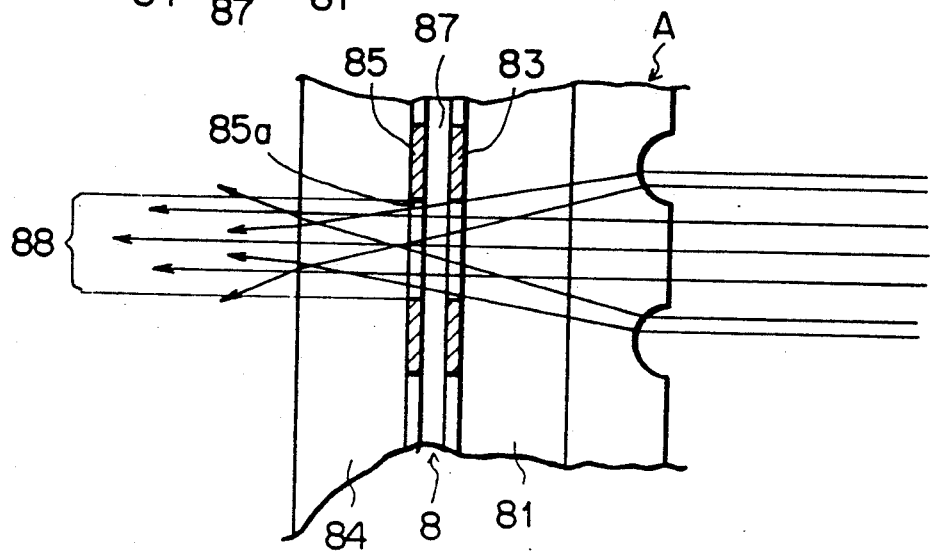

In the foregoing embodiments, the optical elements such as convex lenses or prisms are directed toward the liquid crystal cell 8. They may, however, be directed toward the light source, like optical elements Aa shown in FIG. 10, or formed into concave lenses as shown in FIG. 11. When the optical elements are directed toward the liquid crystal cell 8, it is possible to form a condenser lens integrally on the back (light source side) of the optical sheet as one piece.

While in the above embodiments, the rays of light from the light source are rendered parallel before being thrown into the optical elements, the above-mentioned effect can also be obtained for diffusing or expanding rays of light.

The liquid crystal cell 8 and the optical sheet A may be bonded together by bonding agent.

Although the preceding embodiments have the optical elements formed over the entire surface of the screen (over all pixels), they may be provided partly over any desired portion of the screen from which the image is to be enlarged and projected and which therefore requires an increased luminance.

The liquid crystal display apparatus of FIG. 1 has been described to have a single liquid crystal cell, but it is of course applicable also to a liquid crystal projector which has three liquid crystal cells for three colors—red, green and blue—and combines them to form a color image.

According to the liquid crystal display apparatus of this invention, the optical elements disposed opposite to the corresponding pixels are arranged on the light source side of the liquid crystal cell to focus the light radiated from the light source on each of the pixels. This arrangement enables an effective use of the illuminating light in enhancing the brightness of the image and preventing the temperature rise in the liquid crystal cell.

What is claimed is:

1. A liquid crystal display apparatus comprising:
   an active matrix type liquid crystal cell;
   a light source to radiate illuminating light onto the back of the liquid crystal cell; and optical means on the light source side of the liquid crystal cell and disposed close to and facing pixels of the liquid crystal cell, said optical means being adapted to focus the rays of light from the light source on each of the pixels, wherein said optical means includes a transparent optical sheet having on a surface thereof a number of truncated prisms equal to the number of pixels, and wherein each of said prisms is aligned with a respective one of said pixels of the liquid crystal cell.

2. A liquid crystal display apparatus comprising:

an active matrix type liquid crystal cell;

a light source to radiate illuminating light onto the back of the liquid crystal cell; and optical means on the light source side of the liquid crystal cell and disposed close to and facing pixels of the liquid crystal cell, said optical means being adapted to focus the rays of light from the light source on each of the pixels, wherein said optical means includes a transparent optical sheet having on a surface thereof a number of truncated pyramidal prisms equal to the number of pixels, and wherein each of said prisms is aligned with a respective one of said pixels of the liquid crystal cell.

3. A liquid crystal display apparatus comprising:

an active matrix type liquid crystal cell;

a light source for radiating illuminating light onto the back of the liquid crystal cell; and optical means on the light source side of the liquid crystal cell and disposed close to and facing the pixels of the liquid crystal cell, said optical means being adapted to focus the rays of light from the light source on each of the pixels, wherein said optical means includes a transparent optical sheet extending substantially over the entire light source side and divided into optical elements of a number corresponding to the number of pixels, each of the optical elements being aligned with a respective one of said pixels of the liquid crystal cell, and having top and bottom planar faces which are parallel with said optical sheet and have at least a portion of the light rays passing directly therethrough onto the pixels and having lateral faces which reflect onto the pixels the remaining portion of the light rays incident on each of optical elements.

* * * * *